United States Patent [19]

Gmoser et al.

[11] Patent Number: 4,845,171

[45] Date of Patent: Jul. 4, 1989

[54] SELF-CROSSLINKING CATIONIC PAINT BINDERS CONTAINING UREA AND URETHANE GROUPS AND PROCESS OF MANUFACTURE

[75] Inventors: Johann Gmoser; Willibald Paar; Michael Hönel, all of Graz, Austria

[73] Assignee: Vianova Kunstharz, A.G., Werndorf, Austria

[21] Appl. No.: 128,452

[22] Filed: Dec. 3, 1987

Related U.S. Application Data

[62] Division of Ser. No. 881,950, Jul. 22, 1986, Pat. No. 4,711,935.

[30] Foreign Application Priority Data

| Sep. 16, 1985 | [AT] | Austria | 2689/85 |
| Sep. 18, 1985 | [AT] | Austria | 2712/85 |
| Sep. 25, 1985 | [AT] | Austria | 2786/85 |
| Jun. 27, 1986 | [AT] | Austria | 1743/86 |

[51] Int. Cl.$^4$ .................. C08F 40/00; C08L 61/06
[52] U.S. Cl. .................. 525/452; 204/181.7; 524/901; 525/453; 525/504; 525/507
[58] Field of Search ............... 525/452, 495, 504, 507; 204/181.7; 524/901

[56] References Cited

U.S. PATENT DOCUMENTS

| 3,994,989 | 11/1976 | Kempter et al. | 525/490 |
| 4,086,292 | 4/1978 | Kempter et al. | 525/484 X |
| 4,134,932 | 1/1979 | Kempter et al. | 525/481 |
| 4,393,179 | 7/1983 | Hoppe et al. | 525/490 |

FOREIGN PATENT DOCUMENTS

1021493 11/1977 Canada .
1074489 3/1980 Canada .

*Primary Examiner*—Theodore E. Pertilla
*Attorney, Agent, or Firm*—A. W. Breiner

[57] ABSTRACT

A process for producing self-crosslinking cationic paint binders, water-dilutable upon protonation, on the basis of urea and urethane group carrying reaction products of modified phenols and monoepoxy compounds as well as with the binders produced according to this process and their use in stoving paints, particularly electrodeposition paints are described. The process is characterized in that a substituted urea-phenol-formaldehyde condensate obtained through reaction of an aminoalkylation product of a phenol, carrying an average of at least one secondary amino group with a semi-blocked diisocyanate, or a substituted urea prepared from a semi-blocked diisocyanate and an amine and further reacted with formaldehyde and a phenol, is reacted with a monoepoxy compound, the free aliphatic hydroxy groups of the reaction product being reacted in a further reaction step with di- or polyisocyanates. The paints formulated with these products, at stoving temperatures of from 150° to 170° C., give films with excellent corrosion resistance and adhesion.

12 Claims, No Drawings

SELF-CROSSLINKING CATIONIC PAINT BINDERS CONTAINING UREA AND URETHANE GROUPS AND PROCESS OF MANUFACTURE

This is a division of application Ser. No. 887,950 filed July 22, 1986, now U.S. Pat. No. 4,711,935, issued Dec. 8, 1987.

RELATED CASES

This application relates to concurrently filed Willibald Paar et al, U.S. application entitled "Self-Crosslinking Cationic Pait Binders Containing Urea Groups and Process of Manufacture Ser. No. 06/887,934 filed 7/22/86, now Pat No. 4,711,934."

FIELD OF INVENTION

The present invention is directed to a process for producing self-crosslinking cationic paint binders and to the binders of the process. More particularly, the invention relates to self-crosslinking cationic paint binders, water-dilutable upon protonation, based on urea and urethane group carrying reaction products of modified phenols and epoxy resins.

BACKGROUND OF INVENTION

Paint binders are disclosed in DE-OS No. 23 20 301, corresponding to Canadian Pat. No. 1,021,493, which are obtained by reaction of MANNICH-bases (of condensed phenols, secondary alkanolamines and formaldehyde) with an epoxy resin. Similar binders are disclosed in DE-OS No. 24 19 179, corresponding to U.S. Pat. No. 3,994,989. As stated in DE-OS No. 27 11 385, such systems have the disadvantage that amines are split-off on stoving. Therefore, it has been proposed to use a MANNICH-condensation product of a phenol and/or an alkylphenol, a primary amine, and formaldehyde.

Another proposal for improving the products of the DE-OS No. 23 20 301 and DE-OS No. 24 19 179 references is disclosed in DE-OS No. 27 11 425, corresponding to U.S. Pat. No. 4,134,932, where to such binders water-insoluble urethane group carrying resins are added, and in particular the modified polyamide amine resins. To avoid the splitting off of amines, DE-OS No. 25 41 801, corresponding to U.S. Pat. No. 4,086,292, proposes to react the MANNICH-base with an epoxy resin based on polyhydric alcohols, the hydroxy groups of which are reacted with semi-blocked diisocyanates and optionally with a urethane-free epoxy resin. DE-OS No. 25 54 080, corresponding to Canadian Pat. No. 1,074,489, describes a similar process. In all these cases the reaction with the isocyanates is to suppress the split-off of amines on stoving.

The products produced according to the teachings of the aforesaid references, however, do not meet the requirements of the automobile industry with respect to corrosion resistance at crosslinking temperatures of from about 150° to 170° C. and the adhesion of the stoved film, particularly the adhesion of subsequent coats.

Our copending application filed concurrently with this application entitled "Self-Crosslinking Cationic Paint Binders Containing Urea Groups and Process of Manufacture" discloses cationic binders and a process for producing selfcrosslinking cationic binders water-dilutable on protonation, based on reaction products of substituted urea-phenol-formaldehyde condensates and epoxy resins, and to the binders thereby produced. The process and binders are characterized in that (A-1) an aminoalkylation product carrying an average of at least one NH-group per molecule, of phenol and/or a substituted phenol, preferably a monoalkyl-, monoaryl or monoaralkylphenol with one or optionally two phenolic hydroxy groups, a primary alkylamine and/or primary alkanolamine and/or alkylenediamine and formalydehyde or a formaldehyde donating compound is reacted with a semi-blocked diisocyanate, or (A-2) a semi-blocked diisocyanate is reacted with a primary alkylamine and/or primary alkanolamine and/or alkylene diamine and the resulting substituted urea is reacted with formaldehyde or a formaldehyde donating substance and phenol and/or a substituted phenol preferably a monoalkyl-, monoaryl-, or monoaralkylphenol with one or optionally with two phenolic hydroxy groups, and in a further reaction step (B) 50 to 100% of the phenolic hydroxy groups of component (A) are reacted with epoxy compounds, preferably with diepoxy resins with an epoxy equivalent weight of between 50 and 2000.

These materials meet the requirements of the automobile industry both with respect to corrosion and adhesion.

SUMMARY AND GENERAL DESCRIPTION OF INVENTION

It has now been found that self-crosslinking binders with excellent paint performance can be obtained if in step (B) of the process described in the aforesaid application monoepoxy compounds are employed and the aliphatic hydroxy groups formed in the reaction of the epoxy groups or hydroxy groups otherwise present on the epoxy compound are subsequently reacted with polyisocyanates.

Accordingly, the present invention is directed to a process for producing self-crosslinking cationic paint binders, water-dilutable upon protonation, on the basis of reaction products of substituted urea-phenol-formaldehyde condensates and monoepoxy resins, characterized in that (A-1) an aminoalkylation product carrying an average of at least one NH-group per molecule, of phenol and/or a substituted phenol, preferably a monoalkyl-, monoaryl-, or monoaralkylphenol with one or optionally two phenolic hydroxy groups, a primary alkylamine and/or primary alkanolamine and/or alkylene diamine and formaldehyde or a formaldehyde donating substance is reacted with a semi-blocked diisocyanate or (A-2) a semi-blocked diisocyanate is reacted with a primary alkylamine and/or primary alkanolamine and/or alkylene diamine and the resulting substituted urea is reacted with formaldehyde or a formaldehyde donating substance and phenol and/or a substituted phenol, preferably a monoalkyl-, or monoaryl-, or monoaralkylphenol with one or optionally two phenolic hydroxy groups, and in further reaction steps (B) 50 to 100% of the phenolic hydroxy groups of component (A) are reacted with monoepoxy compounds and, subsequently, (C) 50 to 100 mole-% of the aliphatic hydroxy free through the reaction with the monoepoxy compound are reacted with equivalent quantities of a polyisocyanate.

The invention is also concerned with the paint binders produced according to the process and with their use in aqueous paints, particularly in cathodically depositable electrodeposition paints.

The aminoalkylation products of phenols suitable for the present invention are produced according to the methods known from literature, for example, Houben-Weyl, *Methoden der organischen Chemie*, Vol. XI/1 (1957). The condensation of ureas with phenol and formaldehyde is described, for example, in Houben-Weyl, Vol. XIV/2 (1963). The phenols suitable for both alternatives A-1 and A-2 are phenol or substituted phenols, such as the monoalkyl phenols, preferably those with at least 4 C-atoms in the alkyl radical. Representatives of this group are the o- and p-butylphenols and their higher homologues. Also, aryl phenols can be utilized. Particularly preferred phenols are the polynuclear phenols, such as the various diphenylolalkanes, including bis-(4-hydroxyphenyl)methane or 2,2-bis-(4-hydroxyphenyl)-propane or low molecular weight phenol novolaks are used. Mononuclear phenols can also be used. The preferred phenol is 2,2-bis-(4-hydroxyphenyl)-propane (bisphenol A).

Suitable primary amines for use in the reaction are mono-primary amines, such as butylamine or its isomers and homologues, primary alkanolamines such as monoethanolamine or its homologues, primary-tertiary diamines such as dialkylaminoalkylamines, exemplified by dimethylaminoethylamine or diethylaminopropylamine, or diprimary amines, such as ethylenediamine and its homologues. In addition to the alkylene diamines, diamines can also be used wherein the carbon chain is interrupted by ether or amino groups. Examples of suitable substances of this type are 4,7-dioxadecane-1,10-diamine; 7-methyl-4,10-dioxatridecane-1,13-diamine or polyoxyalkylene diamines of the formula

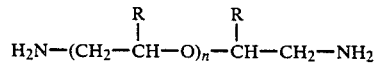

wherein R is H or $CH_3$ and n=1–30. The higher functional amines such as the diethylene- or dipropylenetriamines, polyoxypropylenetriamine and N,N'-bis(3-amino-propyl)-ethylenediamine can also be used. When using amines of higher functionality, it is evident that the further components and reaction conditions have to be judiciously selected in order to prevent gelation. Particularly when using higher functional amines, the quantity of the semi-blocked diisocyanates must be adjusted to the number of NH-functional groups. Further, in this case mononuclear phenols are preferably employed.

It is surprising that even with the use of a difunctional amine, substantially uniform reaction products are obtained on urea formation and aminoalkylation, respectively, with which the further reactions can be carried out in a conventional reaction.

The preferred form of formaldehyde for use according to this invention is the commercially available paraformaldehyde with a formaldehyde content of 80% and more.

In the preferred embodiment of method A-1 above, the aminoalkylation is carried out in order that the components, in the presence of an azeotroic solvent, such as toluol or a corresponding aliphatic hydrocarbon solvent, are heated to the temperature necessary for the azeotropic removal of the reaction water, taking into account an eventual exothermic reaction. After removal of the calculated quantity of water, the solvent preferably is vacuum-stripped, and the reaction product is dissolved with or in an aprotic solvent. Optionally, the further reactions can be carried out in the presence of the entraining agent. The reaction product thus obtained, containing in the molecule an average of at least one secondary amino group, is reacted in a next step at 30° to 50° C. with semi-blocked diisocyanates, using 1 mole of isocyanate compound for each NH-group. Through the reaction of the NH-groups with the semi-blocked diisocyanates, the desired urea groups are formed. Hydroxy groups which may be present depending on the starting reactants will react to a negligible extent only, owing to the preferred reaction of the NH-groups with the NCO-groups.

The semi-blocked diisocyanates for use herein are prepared in known manner. The preferably used diisocyanates are those with different reactivity of the NCO-groups, such as toluylenediisocyanate or isophoronediisocyanate. The preferred blocking agents are aliphatic monoalcohols which—optionally in the presence of catalysts—are split-off under the stoving conditions of the materials. Other blocking agents which may be used include phenols, oximes, amines, unsaturated alcohols, caprolactame, and the like.

In alternative method A-2, in the first step a substituted urea is formed from the semi-blocked diisocyanate and the primary amine. In this reaction, the semi-blocked diisocyanate is added at 30° to 60° C., while cooling, to an isocyan-ate-inert solvent, solution in toluol or a glycoldiether the amine or mixture of various amines and the reaction is carried to an isocyanate value of about zero. Subsequently, at 70° C., the formaldehyde, preferably as paraformaldehyde, is added and the temperature is held for one hour. After addition of the phenol, with rising temperature, the reaction water is entrained through azeotropic distillation at from about 80° to 140° C., with the aid of an entraining agent, preferably toluol. Optionally, the entraining agent is vacuum-stripped afterwards and the batch is dissolved in a hydrophilic solvent.

In the last step, the reaction products prepared according to methods A-1 and A-2 are reacted with monoepoxy compounds with the formation of phenol ethers. The epoxy compounds are glycidylethers such as the butyl-, phenyl-, or allylglycidylethers of hydrocarbon oxides, including the olefin oxides

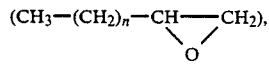

octylene oxide

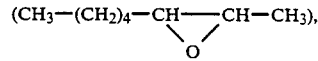

styrol oxide or cyclohexenevinylmonoxide; the glycidyl esters of carboxylic acids, such as glycidyl methacrylate, as well as ethylene or propylene oxide. Particularly preferred for the process of the invention are the glycidyl esters of KOCH-acids, particularly the commercially available glycidylesters of tertiary $C_9$–$C_{11}$- monocarboxylic acids. The reaction is carried out at 100° to 130° C. to an epoxy value of practically zero.

All polyisocyanates are suitable for the linking of the reaction products obtained in step (B). Particularly suited are toluylene diisocyanate, isophorone diisocyanate, hexamethylene diisocyanate, trimethylhexamethylene diisocyanate, and the like; or reaction products of diols with diisocyanates at a mole ratio of 1:2. Suitable polyisocyanates are also reaction products of polyols, such as trimethylolpropane, with the corresponding quantities of toluylene diisocyanate, and the like. The reaction with the polyisocyanates is carried out at 50° to 100° C. with slow addition of the isocyanate compound. The reaction is carried to the complete reaction of all NCO-groups. Preferably the reaction is carried out in the presence of aprotic solvents.

It has been established that the intermediate products obtained in this latter step as well as the final products show pratically no difference, regardless of whether the intermediate product employed with the epoxy resin was prepared according to method A-1 or method A-2. Therefore, it can be assumed that in both cases products result with the same basic composition according to the proposed formula

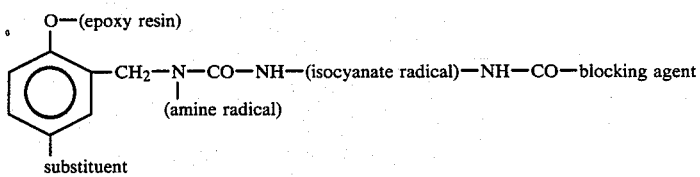

The isocyanate compounds in step (C) are used in a quantity in order that 50 to 100 mole-% of the aliphatic hydroxy groups resulting from the opening of the ring of the glycidyl group of the monoepoxy compound are reacted.

When formulating the reaction batches care is to be taken to obtain final products having the basicity necessary for safeguarding a sufficient stability of the aqueous solution of the binder. The introduction of tertiary amino groups to provide a basicity based on an amine value of at least 30 mg KOH/g is preferably effected through primary-tertiary diamines during aminoalkylation or through the use of suitable amines for semi-blocking the diisocyanates. To achieve waterdilutability, the basic groups of the binder are partially or totally neutralized with acids, preferably formic acid, acetic acid, or lactic acid. For an extent of dilution adequate for practical use, normally a degree of neutralization of 20 to 60% is sufficient, corresponding to a quantity of about 20 to 60 millimoles of acid for 100 g of resin solids. The binders are diluted with deionized water to the desired degree of concentration. Optionally, prior to neutralization and dilution, or in partially diluted form, the binders are processed to pigmented paints with crosslinking catalysts, pigments, extenders, and other additives. The formulation of such paints and their use for electrodeposition are known to one skilled in the art and are described in the literature. When the deposited coatings are used as primers, they are cured at 150° to 170° C. for 10 to 30 minutes. Unless the binders have sufficient crosslinking structures, they are combined with additional crosslinkers such as the blocked isocyanates or amine and phenolic resins.

In a special embodiment, a polyhydroxy compound is admixed with the binders. The polyhydroxy compound can be water-soluble or substantially water-insoluble, and will have a hydroxy equivalent weight at a maximum of 1000 and preferably from about 100 to 400. The hydroxy equivalent weight as used herein is the quantity of resin solids (in grams) which contains one mole hydroxy groups. Through this measure, on the one hand, the hydroxy balance important for crosslinking the products is improved. Further, it is possible by this alternative to influence the deposition behavior and the film properties of the binders. The blends may contain between 5 to 80% by weight (b.w.), preferably 10 to 50% b.w., based on resin solids of this additional component. The suitable water-soluble polyhydroxy compounds are preferably protonated epoxy resin amine adducts and modification products thereof. Products of this type are known from the literature. The selection is governed essentially by the hydroxy equivalent weight. Especially in the formulation of electrodeposition paint binders, materials are preferred which are higher in molecular weight and water-dilutable on protonation, or materials which are not water-dilutable resins but are compatible with the basic resin. Among the latter are, in addition to monomeric polyols with restricted water-solubility, such as trimethylolethane or trimethylolpropane or pentaerythritol, defunctionalized phenols with the necessary hydroxy equivalents weights, such as the reaction products of bisphenol A with ethylene or propylene oxide, defunctionalized phenol novolaks, epoxy resin esters, epoxy resin amine adducts, substantially insoluble in water, even after protonation, and hydroxy group containing polyurethanes, polyamides and copolymers, for example the available copolymers of unsaturated alcohols and styrol. The admixture of these components is effected, optionally at moderately elevated temperature particularly when using the water-insoluble components, prior to protonation and dilution of the basic resin.

The products of the invention with suitable adjustment of the solids content and the like, can also be applied by methods other than electrodeposition such as by dipping, roller coating, or spraying. Optionally, the binders can be processed in organic solvents.

DETAILED AND PRESENTLY PREFERRED EMBODIMENTS

The following examples illustrate the invention without limiting its scope. Parts and percentages are by weight unless otherwise stated.

EXAMPLE 1

In a suitable reaction vessel 228 parts (1 mole) bisphenol A, 260 parts (2 moles) diethylaminopropylamine, and 66 parts (2 moles) paraformaldehyde, 91%, are reacted in the presence of toluol as entraining agent at 90° to 130° C. until 42 parts reaction water are separated. After addition of 152 parts diethyleneglycol dimethylether and cooling to 30° C., 608 parts (2.0 moles) of a toluylene diisocyanate semi-blocked with 2-ethylhexanol are added within 45 minutes. As soon as all isocyanate groups are consumed, 1400 parts of this solution are blended with 500 parts (2 moles) of the glycidylester of a saturated tertiary $C_9$-$C_{11}$-monocarboxylic acid, dissolved in 300 parts diethyleneglycol dimethylether and reacted at 95° to 100° C. to an epoxy value of zero. After cooling to 80° C., 210 parts (1 mole) trimethylhexamethylene diisocyanate, dissolved in 53 parts diethyleneglycol dimethylether are added within 30 minutes. The completeness of the reaction is controlled and 0.6 parts/100 g resin solids (calculated as metal) of dibutyltindilaurate (or another tin catalyst) are added and the resin is rendered water-dilutable through the addition of 35 millimoles formic acid per 100 g resin solids.

Electrodeposited films, cured at 160° C., have a resistance to methylethylketone of more than 150 double rubs. This test as used herein comprises rubbing the film with methylethylketone in a forward and a return stroke. The forward and return stroke constitutes one double rub.

EXAMPLE 2

70 parts, based on resins solids, of the reaction product prepared according to Example 1, prior to the addition of the catalyst (dibutyltindilaurate) and the neutralizing agent, are thoroughly blended with 30 parts, based on resin solids, of a water insoluble polyhyroxy compound which is a commercially available styrol/allyl alcohol copolymer having a molecular weight of about 1150, 70% solids in diethyleneglycol dimethylether with a hydroxy equivalent weight of about 220. Then 0.6 parts, calculated as metal, of dibutyltindilaurate and 40 millimoles formic acid are added. Paint films electrodeposited from the 10% aqueous varnish, upon curing at 160° C., give a resistance of methylethylketone of more than 150 double rubs.

EXAMPLE 3

440 parts (2.0 moles) nonylphenol, analogous to Example 1, are condensed with 260 parts (2.0 moles) diethylaminopropylamine, 116 parts (1.0 mole) 1,6-hexamethylene diamine, and 132 parts (4.0 moles) paraformaldehyde, 91%, in the presence of 237 parts toluol, with the separation of 84 parts of reaction water. After dilution with 663 parts toluol, at 40° C., while cooling, 1248 parts of the monoisocyanate prepared from isophoronediisocyanate and ethyleneglycol monoethylether are added and reacted for one hour at 60° C. The toluol is substantially vacuum-stripped and replaced with diethyleneglycol dimethylether. The solids content is adjusted to 70%.

372 parts (2.0 moles) 2-ethylhexylglycidylether are added and the batch is held at 95° to 100° C., until all epoxy groups have reacted. Then, within 30 to 45 minutes, at 75° to 80° C., 105 parts (0.5 mole) trimethylhexamethylene diisocyanate are added while cooling. At the end of the addition, an NCO-value of practically zero is attained.

75 parts based on resin solids of the product as above prepared are mixed with 25 parts based on resin solids of a reaction product of 475 parts (1 Val) of a bisphenol-A epoxy resin and 134 parts (1 mole) dimethylol propionic acid, as a 70% solution in methoxypropanol; 0.8 parts/100 g resin solids of dibutyltindilaurate and 45 millimoles/100 g resin solids of formic acid are added. Upon dilution with water to a solids content of 12%, the varnish is cathodically electrodeposited on a steel panel. The film, cured at 160° C. and having a thickness of about 20 μm, has a resistance to methylethylketone of more than 150 double rubs.

The term "Val" refers to the equivalent weight in grams for the designated functional group and, accordingly, is equivalent to groups. The term "bisphenol A epoxy resin" as used herein refers to an epoxy resin formed by the reaction of the sodium salt of bisphenol A with epichlorohydrin, the ratios of materials being selected to provide the designated epoxy equivalent weight according to conventional reaction methods.

EXAMPLE 4

150 parts (1.0 mole) p-tert.-butylphenol are condensed at 90° to 130° C. together with 204 parts (2.0 moles) dimethylaminopropylamine and 66 parts (2.0 moles) paraformaldehyde, 91%, in the presence of 100 parts toluol, are reacted as in Example 3 until 42 parts reaction water have separated. After addition of 330 parts diethyleneglycol dimethylether, 496 parts of a toluylene diisocyanate semi-blocked with n-butanol are slowly added, at 40° C., while cooling.

1315 parts of this solution are reacted with 368 parts (2.0 moles) dodecene oxide at 95° to 100° C. to an epoxy value of zero and, subsequently, at 80° C., while cooling, with 222 parts (1.0 mole) isophoronediisocyanate.

Upon addition of 50 millimoles/100 g resin solids of acetic acid, the binder is water-soluble. Through the addition of 0.6 parts/100 g resin solids of tin as dibutyltindilaurate and dilution with deionized water to a solids content of 15% a clear varnish results. Films electrodeposited on steel panels are cured for 15 minutes at 170° C. and, with a dry film thickness of about 20 μm, exhibit a resistance to methylethylketone of 200 double rubs.

EXAMPLE 5

94 parts (1.0 mole) phenol are reacted with 260 parts (2.0 moles) diethylaminopropylamine and 66 parts (2 moles) paraformaldehyde, 91%, at 80° to 130° C., in the presence of 120 parts toluol, until 42 parts reaction water have separated. After addition of 300 parts toluol, 608 parts (2 moles) of toluylene diisocyanate semi-blocked with 2-ethylhexanol are reacted at 40° to 60° C., while cooling. The reaction with the monoglycidyl compound is carried out at 120° C. with 150 parts (1.0 mole) phenylglycidyl ether. Then, 212 parts of a 75% solution of a commercially available triisocyanate of trimethylolpropane and toluylene diisocyanate (1 NCO-equivalent) are added at 80° to 100° C. within one hour. At the end of the addition a product is obtained which is free from isocyanate groups.

A clear varnish of 15% solids is prepared through the addition of 0.8 parts/100 g resin solids of tin (as dibutyltindilaurate), 55 millimoles/100 g resin solids of formic acid, and deionized water. A cathodically deposited film, cured for 20 minutes at 170° C., has a resistance of methylethylketone of about 150 double rubs.

In Examples 6 and 7, intermediate products are utilized prepared in accordance with method A-2.

EXAMPLE 6

260 parts (2 moles) diethylaminopropylamine, in 280 parts toluol, are reacted at 30° to 60° C., while cooling, with 608 parts of a diisocyanate semi-blocked with 2-ethylhexanol (2 moles) until all NCO-groups have reacted. After addition of 66 parts (2 moles) paraformaldehyde, 91%, the blend is held for one hour at 70° C. Subsequently, 228 parts (1 mole) bisphenol A are added and, at 80° to 140° C., by azeotropic distillation with the aid of toluol as entraining agent, about 40 parts of reaction water are separated.

1400 parts of the product are blended with 500 parts (2 moles) of the glycidylester of a saturated tertiary $C_9$-$C_{11}$-monocarboxylic acid, dissolved in 300 parts diethyleneglycol dimethylether and reacted at 95° to 100° C. to an epoxy value of zero. After cooling to 80° C., 210 parts (1 mole) trimethylhexamethylene diisocyanate, dissolved in 53 parts diethyleneglycol dimethylether, are added within 30 minutes. The completeness of the reaction is controlled and 0.6 parts/100 g resin solids, calculated as metal, of dibutyltindilaurate are added and the resin is rendered water-dilutable through the addition of 35 millimoles formic acid per 100 g resin solids.

Electrodeposited films, cured at 160° C., have a resistance to methylethylketone of more than 150 double rubs.

EXAMPLE 7

A blend of 260 parts (2 moles) diethylaminopropylamine and 116 parts (1 mole) 1,6-hexamethylenediamine is dissolved in 875 parts toluol and, at 30° to 50° C., while cooling, 1248 parts of an isophorone diisocyanate, semi-blocked with ethyleneglycol monomethylether are added in portions. A temperature of 50° C. is held until an NCO-value of zero is attained. The temperature is raised to 70° C. and, at this temperature, 132 parts (4 moles) paraformaldehyde, 91%, are added. The temperature is held for one hour and then 440 parts (2 moles) nonylphenol are added. Subsequently, at a temperature of from 80° to 140° C. an azeotropic distillation is carried out, until 84 parts reaction water have separated. After vacuum-stripping the toluol, the solids content is adjusted to 70% with diethyleneglycol dimethylether.

372 parts (2.0 moles) 2-ethylhexylglycidylether are added and the batch is held at 95° to 100° C. until all epoxy groups have reacted. Then, within 30 to 45 minutes, at 75° to 80° C., 105 parts (0.5 mole) trimethylhexamethylene diisocyanate are added while cooling. The addition finished, an NCO-value of practically zero is attached.

75 parts based on resin solids of the product are mixed with 25 parts based on resin solids of a reaction product of 475 parts (1 Val) of a bisphenol-A epoxy resin and 134 parts (1 mole) dimethylol propionic acid (as 70% solution in methoxypropanol); 0.8 parts/100 g resin solids of dibutyltindilaurate and 45 millimoles/100 g resin solids of formic acid are added. Upon dilution with water to a solids content of 12%, the varnish is cathodically electrodeposited on a steel panel. The film, cured at 160° C. and having a thickness of about 20 μm, has a resistance to methylethylketone of more than 150 double rubs.

Preparation and Evaluation of Pigmented Paints Based on the Binders of the Invention As listed in Table 1, pigmented paints are prepared and electrodeposited as is conventional on clean zinc-phosphated steel panels, the panels being wired as the cathode in an electrodeposition system. The conditions were chosen such that after curing for 15 minutes at 170° C. a film of 20 μm dry film thickness results. Table 1 is as follows:

TABLE 1

| Paint | Binder Ex | Pigment Paste* | Pigment/Binder Ratio (paint) | Catalyst (1) | Neutralization (2) | Paint Solids (3) |
|---|---|---|---|---|---|---|
| A | 1 | I | 0.3:1 | 0.5 | 35 | 20 |
| B | 2 | I | 0.4:1 | 0.7 | 35 | 16 |
| C | 3 | I | 0.35:1 | 0.6 | 45 | 18 |
| D | 4 | II | 0.5:1 | 0.8 | 50 | 18 |
| E | 5 | II | 0.4:1 | 0.8 | 55 | 16 |
| F | 6 | I | 0.3:1 | 0.5 | 35 | 20 |
| G | 7 | I | 0.35:1 | 0.6 | 45 | 18 |

(1)% Tin (as dibutyltindilaurate)
(2)millimoles formic acid per 100 g resin solids
(3)% total solids
viscosity: 2600 mPa.s/25° C.
oxazolidine equivalent (calc.): 604
amine value: 185 mg KOH/g
aliphatic content: 80%
molecular weight (calc.): 1632
solubility (1): 25 millimoles formic acid per 100 g rein solids
(1)Quantity of acid necessary to form a stable aqueous solution.

A 15% solution is prepared from 100 parts based on resin solids of the grinding vehicle, 20 parts of a 25% solution in EGL (ethylene glycol monoethyl ether) of a wetting agent based on an acetylene alcohol, 24 parts lactic acid (5-N) and deionized water, and is passed over a laboratory pearl mill together with 24 parts carbon black, 1104 parts titanium dioxide, and 72 parts basic lead silicate (pigment/binder ratio 12:1).

Pigment paste II is based on a resin which is water-soluble upon protonation, produced as follows: 500 parts of an epoxy resin based on bisphenol A (epoxy equivalent weight about 500) are dissolved in 214 parts propyleneglycol monomethylether and reacted at 110° C. with 83 parts of a semi-ester of phthalic anhydride and 2-ethylhexanol, to an acid value of below 3 mg KOH/g in the presence of 0.5 g triethylamine. Then 120 parts of an NH-functional oxazolidine of aminoethylethanolamine, 2-ethylhexylacrylate and formaldehyde, and 26 parts diethylaminopropylamine are added and the batch is reacted at 80° C. to an epoxy value of practically zero. The batch is diluted with 200 parts propyleneglycol monomethylether.

100 parts based on resin solids of the paste are milled with 1 part carbon black, 147 parts $TiO_2$ and 12 parts basic lead silicate (pigment/binder ratio 1.6:1).

The corrosion resistance of films prepared from the pigmented pastes prepared in Table 1 was tested in the salt spray test according to ASTM B 117-73. Other tests of the films included a cross incision test (DIN 53 151) and a mandrel test (DIN 53 152). The results are listed in Table 2.

TABLE 2

| | Test Results | | |
|---|---|---|---|
| Paint | Salt Spray Test/Hours | Cross Incision | Mandrel Test (mm) |
| A | 750 | 2 | 8 |
| B | 1200 | 1 | 6 |
| C | 1500 | 0 | 8 |
| D | 1000 | 1 | 2 |
| E | 1000 | 0 | 5 |
| F | 750 | 2 | 8 |
| G | 1200 | 0 | 8 |

It is surprising that even with reduced stoving temperatures to 160° and 150° C., with a stoving time of 15 to preferably 20 minutes, the results are not substantially inferior.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing self-crosslinking cationic paint binders, water-dilutable on protonation, based on reaction products of substituted urea-phenol-formaldehyde condensates and mono-1,2-epoxy compounds, wherein in a first step component (A) which is
   (A-1) an aminoalkylation product carrying an average of at least one NH-group per molecule, of a phenol compound, an amino compound selected from the group consisting of a primary alkylamine, a primary alkanolamine, and an alkylenediamine and formaldehyde is reacted with a semiblocked diisocyanate or
   (A-2) a semi-blocked diisocyanate is reacted with an amino compound selected from the group consisting of a primary alkylamine, a primary alkanolamine, and an alkylenediamine, and the resulting substituted urea is reacted with formaldehyde and a phenol compound,
and in further reaction steps,
   (B) from about 50 to 100% of the phenolic hydroxy groups of component (A) are reacted with a mono-1,2-epoxy compound, and subsequently
   (C) from about 50 to 100 mole-% of the aliphatic hydroxy groups set free through the reaction of the mono-1,2-epoxy compound are reacted with equivalent quantities of a polyisocyanate.

2. The process according to claim 1 wherein in component (A) the phenol compound is a monoalkylphenol.

3. The process according to claim 1 wherein in component (A) the phenol compound is a monoarylphenol.

4. The process according to claim 1 wherein in component (A) the phenol compound is aralkylphenol.

5. The process according to claim 4 wherein the aralkylphenol contains two phenolic hydroxy groups.

6. The process according to claim 1 wherein in component (A) the source of formaldehyde is paraformaldehyde.

7. The process according to claim 1 wherein in component (A) the semi-blocked diisocyanate is toluylene diisocyanate blocked with an aliphatic monoalcohol.

8. The process according to claim 7 wherein the aliphatic monoalcohols will split-off at a temperature of from about 150° to 170° C.

9. The process according to claim 1 wherein the condensation reaction with the phenol is carried out at the temperature at which the azeotropic entrainment of the reaction water with an entraining agent occurs.

10. The process according to claim 1 wherein the amines of component (A) are diprimary alkylamines used in combination with primary-tertiary alkylamines.

11. The process according to claim 1 wherein the mono-1,2-epoxy compound in step (B) is a glycidylester of a KOCH-acid.

12. The process according to claim 1 wherein the polyisocyanate in step (C) is the reaction product of a polyol with a diisocyanate in a mole ratio of from 1:n, n being the number of hydroxy groups.

* * * * *